(12) United States Patent
Liang et al.

(10) Patent No.: US 11,947,162 B2
(45) Date of Patent: Apr. 2, 2024

(54) GUIDING APPARATUS FOR AN IMAGING LIGHT PATH AND GUIDING METHOD THEREOF

(71) Applicant: KDH ADVANCED RESEARCH PTY LTD, Balwyn North (AU)

(72) Inventors: Wei-Young Liang, Taipei (TW); Chung-Hsien Lu, Taipei (TW); Ranjith Rajasekharan Unnithan, Melbourne (AU)

(73) Assignee: KDH Advanced Research Pty Ltd, Balwyn North (AU)

( * ) Notice: Subject to any disclaimer, the term of this patent is extended or adjusted under 35 U.S.C. 154(b) by 0 days.

(21) Appl. No.: 18/087,311

(22) Filed: Dec. 22, 2022

(65) Prior Publication Data

US 2023/0185020 A1    Jun. 15, 2023

Related U.S. Application Data

(63) Continuation of application No. 16/706,867, filed on Dec. 9, 2019, now abandoned.

(51) Int. Cl.
*G02B 6/06* (2006.01)
(52) U.S. Cl.
CPC ...................................... *G02B 6/06* (2013.01)
(58) Field of Classification Search
CPC ............................................................ G02B 6/02
See application file for complete search history.

(56) References Cited

U.S. PATENT DOCUMENTS

| 4,306,765 | A  | 12/1981 | Winzer et al. |
| 4,325,605 | A  | 4/1982  | Winzer et al. |
| 4,398,791 | A  | 8/1983  | Dorsey |
| 4,439,005 | A  | 3/1984  | Winzer |
| 4,862,873 | A  | 9/1989  | Yajima et al. |
| 6,735,462 | B2 | 5/2004  | Klocek et al. |
| 8,214,010 | B2 | 7/2012  | Courtney et al. |

(Continued)

OTHER PUBLICATIONS

Australian Patent Office, International-Type Search Report for International Application No. 2020903198, dated Oct. 15, 2020, 21 pages.

(Continued)

*Primary Examiner* — Leslie C Pascal
(74) *Attorney, Agent, or Firm* — Foley Hoag LLP; Erik A. Huestis; Joshua S. Matloff

(57) ABSTRACT

The present invention relates to a guiding apparatus for an imaging light path and a guiding method thereof. The guiding apparatus comprises at least one light-projection system to project at least one visible light beam and at least one light-guiding device disposed corresponding to the light-projection system. The light-guiding device has a first end, a second end, and a light path disposed between the first end and the second end. The visible light beam projected from the light-projection system is received at the first end and guided to an image-receiving object, including but not limited to the user's eyes, out of the second end through the light path to form a real or virtual image. The effects of high brightness of the visible light beam arriving at the image-receiving object, low consumption of light energy, and improved installation flexibility in a space-limited apparatus can be obtained.

11 Claims, 23 Drawing Sheets

(56) References Cited

U.S. PATENT DOCUMENTS

| | | |
|---|---|---|
| 10,307,047 B2 | 6/2019 | Scheller et al. |
| 10,634,899 B2 | 4/2020 | Gopinath et al. |
| 2003/0141096 A1 | 7/2003 | Saccomanno |
| 2004/0076394 A1 | 4/2004 | Carniel et al. |
| 2004/0234224 A1 | 11/2004 | Ishizaki et al. |
| 2006/0002108 A1 | 1/2006 | Ouderkirk et al. |
| 2007/0140615 A1 | 6/2007 | Tanaka et al. |
| 2007/0172171 A1 | 7/2007 | Van Ostrand et al. |
| 2010/0074579 A1 | 3/2010 | Fujii et al. |
| 2014/0176862 A1* | 6/2014 | Uehara .............. G02B 6/06 349/62 |
| 2015/0205126 A1* | 7/2015 | Schowengerdt ..... G02B 5/1814 345/633 |
| 2016/0239092 A1* | 8/2016 | Junuzovic ............ H04N 13/366 |
| 2020/0041720 A1 | 2/2020 | Morales Rodriguez et al. |
| 2020/0088944 A1* | 3/2020 | Sato .................. B60Q 1/5035 |
| 2023/0023734 A1 | 1/2023 | Unnithan et al. |

OTHER PUBLICATIONS

International Search Report and Written Opinion dated Jan. 29, 2021, in connection with International Patent Application No. PCT/AU2020/051347, filed Dec. 9, 2020, 12 pgs.

* cited by examiner

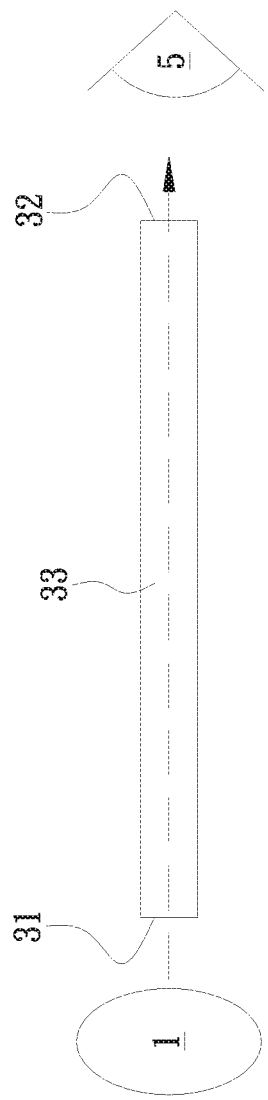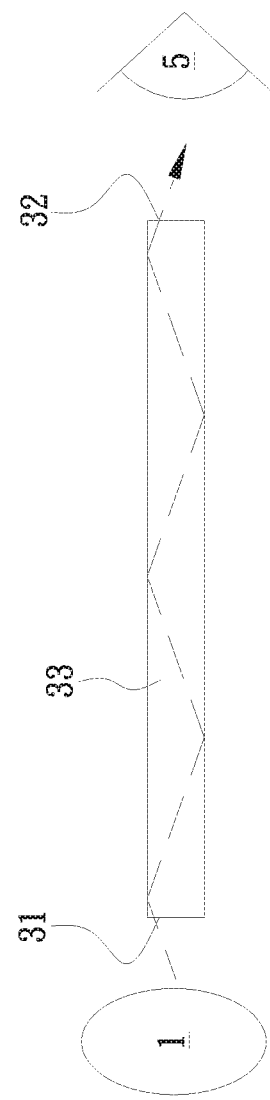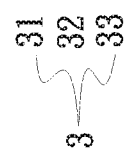
FIG. 1
FIG. 2

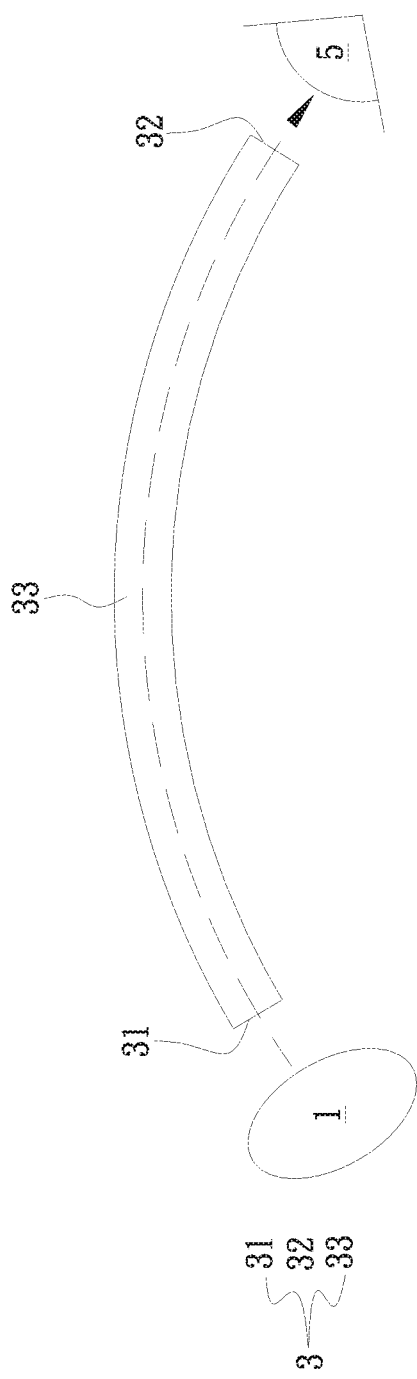
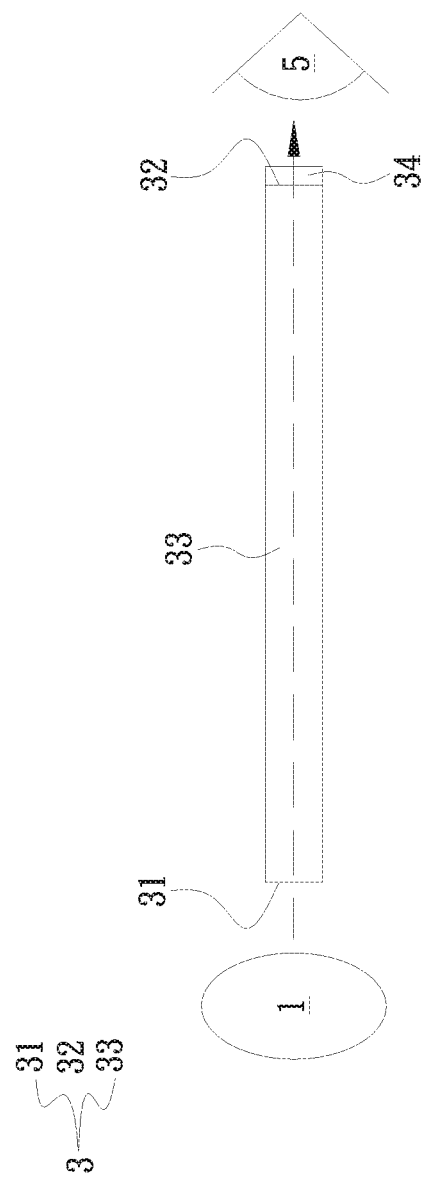

GUIDING APPARATUS FOR AN IMAGING LIGHT PATH AND GUIDING METHOD THEREOF

BACKGROUND OF THE INVENTION

Field of the Invention

The present invention relates to a guiding apparatus for an imaging light path and a guiding method thereof and in particular to a guiding apparatus for an imaging light path and a guiding method thereof which can improve the installation flexibility of a light source in a space-limited apparatus and enable the light beam arriving at the image-receiving object to have high brightness with low consumption of light energy.

Description of Prior Art

A traditional projection imaging method projects the light beam to the image-receiving object through air as a medium. The advantage of this method is high brightness of the light beam arriving at the image-receiving object and low consumption of light energy. However, this method allows the light beam to travel only in a straight line, which limits the installation flexibility of a light source in a space-limited apparatus. To make the light beam change the traveling direction, additional reflective structures can be placed on the light path to change the direction of the light path. However, the disposition of the additional reflective structures causes some problems such as higher manufacturing cost, production difficulties, complex design, and increased size. Another traditional projection imaging method guides the light beam through the grating or diffraction, not constrained by the straight movement, which however decreases the brightness of the light beam arriving at the image-receiving object and consumes more light energy. Consequently, the designs of the power supply and the heat dissipation mechanism become difficult. In addition, the interference may be caused as the light beams travels along the light path and creates difficulty in design and mass production regarding the optical grade carrier material and forming structures, unfavorable for the imaging and display quality.

How to solve the above-mentioned problems is the target that the researchers in this field strive to reach.

SUMMARY OF THE INVENTION

One objective of the present invention is to provide a guiding apparatus for an imaging light path and a guiding method thereof which can improve the installation flexibility of a light source in a space-limited apparatus and enable the light beam arriving at the image-receiving object to have high brightness with low consumption of light energy.

To achieve the above objective, the present invention provides a guiding apparatus for an imaging light path. The guiding apparatus comprises at least one light-projection system and at least one light-guiding device. The at least one light-projection system is used to project at least one visible light beam. The at least one light-guiding device is disposed corresponding to the at least one light-projection system and has a first end, a second end extending outward from the first end, and a light path disposed between the first end and the second end. The at least one visible light beam projected correspondingly by the at least one light-projection system is received at the first end and is guided to an image-receiving object out of the second end through the light path to form an image.

To achieve the above objective, the present invention also provides a guiding method of an imaging light path, which comprises the steps of providing at least one light-projection system used to project at least one visible light beam and providing at least one light-guiding device disposed corresponding to the at least one light-projection system. The first end of the at least one light-guiding device receives the at least one visible light beam projected correspondingly by the at least one light-projection system. The light path of the at least one light-guiding device guides the at least one visible light beam to an image-receiving object out of the second end of the at least one light-guiding device to form an image. The second end extends outward from the first end; the light path is disposed between the first end and the second end.

By means of the design of the present invention, the visible light beam projected by the light-projection system can have a straight, polyline, or curved traveling path, high brightness when arriving at the image-receiving object, and consume less light energy. Besides, the installation flexibility in a space-limited apparatus can be improved.

BRIEF DESCRIPTION OF DRAWING

FIG. 1 is a side view of the guiding apparatus for an imaging light path according to the first embodiment of the present invention;

FIG. 2 is a schematic view of the guiding apparatus for an imaging light path according to the first embodiment of the present invention in a practical embodiment;

FIG. 3 is a schematic view of the curved light-guiding device of the guiding apparatus for an imaging light path according to the first embodiment of the present invention;

FIG. 4 is a schematic view of the guiding apparatus for an imaging light path according to the first embodiment of the present invention, attached with a structure having a different refractive index;

DETAILED DESCRIPTION OF THE INVENTION

Figure 5:
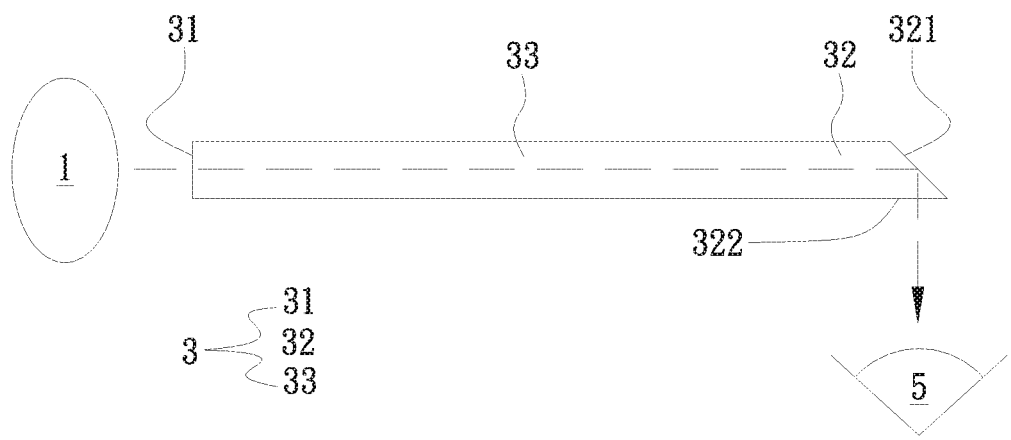
FIG. 5 is a schematic view of the light beam reflected and leaving at the second end of the light-guiding device of the guiding apparatus for an imaging light path according to the first embodiment of the present invention.

The above objectives, the structural and functional characteristics of the present invention will be described according to the preferred embodiments with the accompanying figures.

Please refer to FIG. 1, which is a side view of the guiding apparatus for an imaging light path according to the first embodiment of the present invention. As shown in FIG. 1, the guiding apparatus for an imaging light path of the present invention comprises at least one light-projection system 1 and at least one light-guiding device 3. In the current embodiment, a light-projection system 1 and a light-guiding device 3 are shown. The configuration of plural light-projection systems 1 and plural light-guiding devices 3 will be described in another embodiment.

The light-projection system 1 is used to project a visible light beam which is indicated by a dashed arrow. In the current embodiment, the light-projection system 1 is an organic light-emitting diode display, but not limited to this. In other embodiments, the light-projection system 1 can be a light-emitting diode display, a micro light-emitting diode display, a MEMS controlled laser projector, a liquid crystal on silicon projector, a thin film transistor liquid crystal display, or a digital light processing projector. The visible light beam has a wavelength ranging from 380 nm to 750 nm, which can be observed by human eyes after being processed and can be projected by the light-projection system 1.

The light-guiding device 3 is disposed corresponding to the light-projection system 1. The light-guiding device 3 has a first end 31, a second end 32, and a light path 33. The second end 32 extends outward from the first end 31; that is, the second end 32 extends from the first end 31, away from the light-projection system 1. The light path 33 is disposed between the first end 31 and the second end 32. The visible light beam projected correspondingly by the light-projection system 1 is received at the first end 31 and guided to an image-receiving object 5 out of the second end 32 through the light path 33 to form an image.

The light-guiding device 3 is a structure of a solid transparent bar. The visible light beam projected by the light-projection system 1 can travel in a straight path or a zigzag path (internal total reflection shown in FIG. 2) on the light path by adjusting the incident angle. For convenient expression, the travelling direction of the visible light beam is represented by a single dashed arrow shown in FIG. 1.

In the current embodiment, the light-guiding device 3 is a straight bar structure, but not limited to this. In other embodiments, the light-guiding device 3 can be a curved bar structure (see FIG. 3). The end surface of the second end 32 of the light-guiding device 3 is surface-treated to form a transparent surface in the current embodiment such that the visible light beam is able to pass through the second end 32, but not limited to this. In other embodiments, the end surface of the second end 32 of the light-guiding device 3 can be attached with a structure 34 having a different refractive index (see FIG. 4) to form a transparent surface in which the refractive index of the structure 34 having a different refractive index is different from that of the light-guiding device 3.

Figure 6:
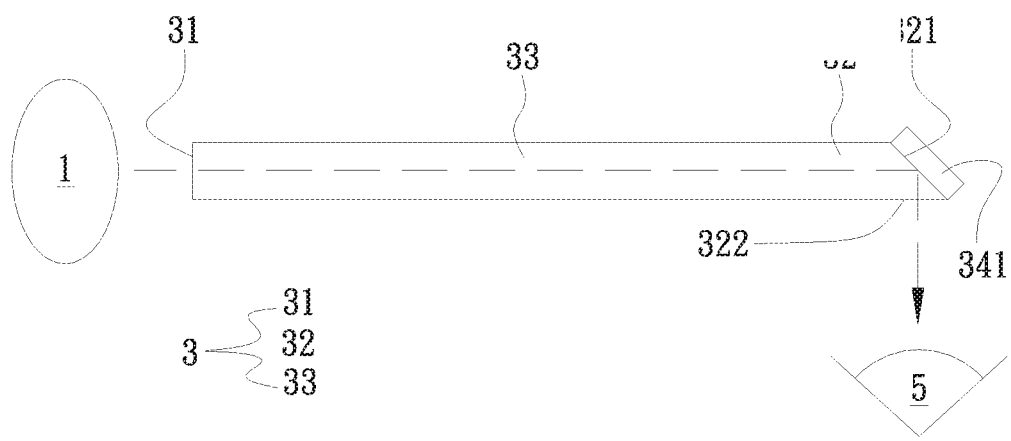
FIG. 6 is another schematic view of the light beam reflected and leaving at the second end of the light-guiding device of the guiding apparatus for an imaging light path according to the first embodiment of the present invention.
Figure 7:
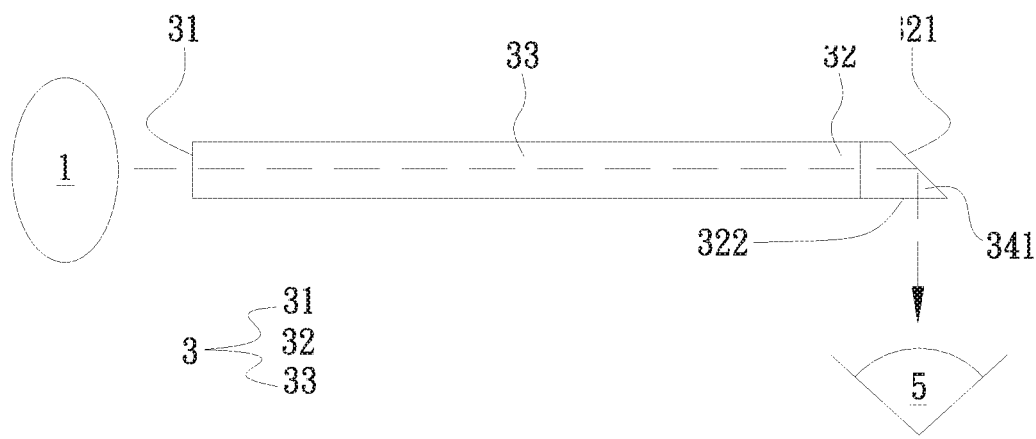
FIG. 7 is still another schematic view of the light beam reflected and leaving at the second end of the light-guiding device of the guiding apparatus for an imaging light path according to the first embodiment of the present invention.

In an alternative embodiment, the end surface of the second end 32 of the light-guiding device 3 is surface-treated to form a reflective surface 321 such that the visible light beam cannot pass through the second end 32 but is reflected to a predetermined direction. Besides, the second end 32 corresponding to the reflective surface 321 is surface-treated to form a light-leaving surface 322 (see FIG. 5), but not limited to this. In other embodiments, the end surface of the second end 32 of the light-guiding device 3 can be attached with a structure 341 having a different refractive index (see FIGS. 6 and 7), to form a transparent surface and the second end 32 corresponding to the reflective surface 321 is surface-treated to form a light-leaving surface 322. In this way, by means of reflection or refraction, the visible light beam can travel in a bent direction.

Figure 8:
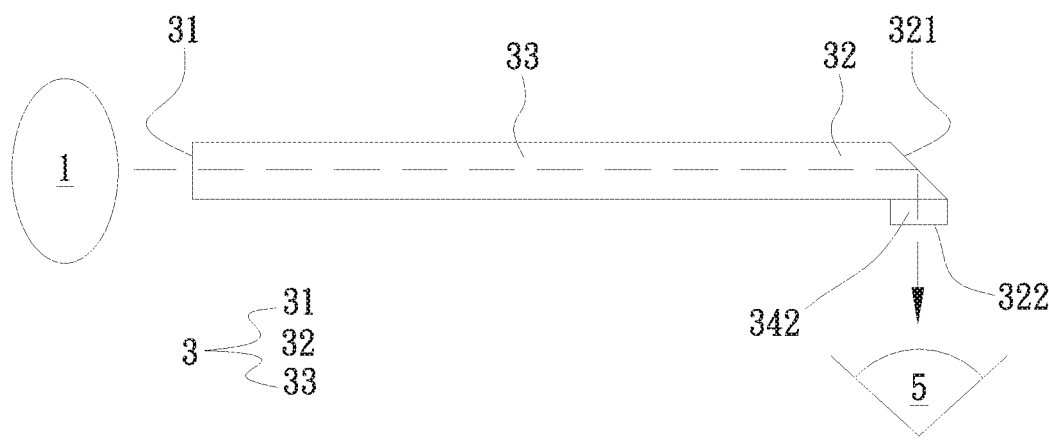
FIG. 8 is yet still another schematic view of the light beam reflected and leaving at the second end of the light-guiding device of the guiding apparatus for an imaging light path according to the first embodiment of the present invention.
Figure 9:
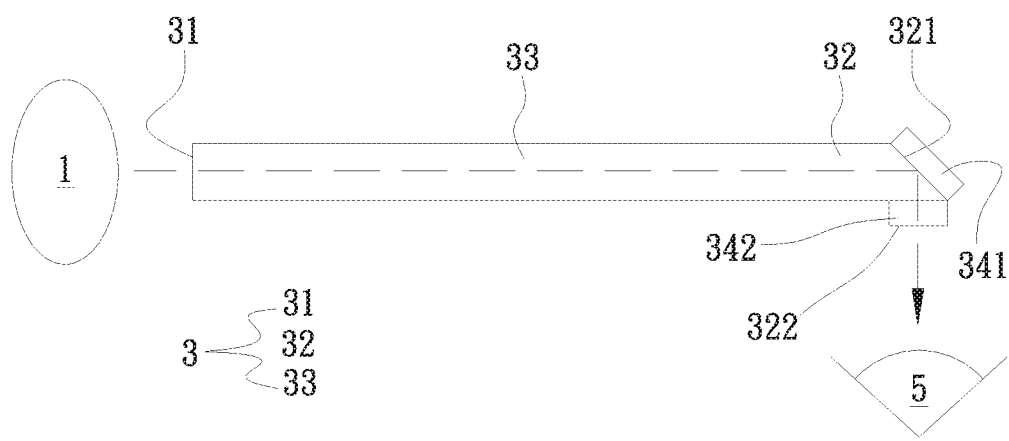
FIG. 9 is still yet another schematic view of the light beam reflected and leaving at the second end of the light-guiding device of the guiding apparatus for an imaging light path according to the first embodiment of the present invention.
Figure 10:
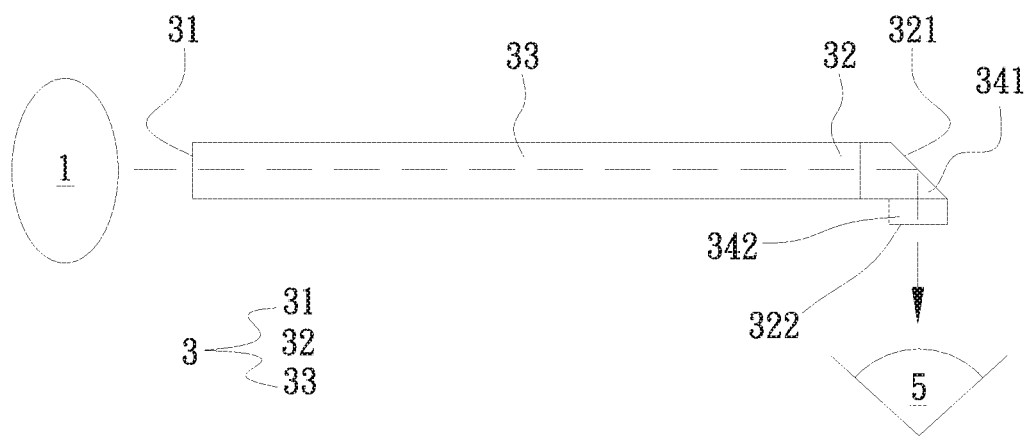
FIG. 10 is yet another schematic view of the light beam reflected and leaving at the second end of the light-guiding device of the guiding apparatus for an imaging light path according to the first embodiment of the present invention.

In an alternative embodiment, the second end 32 corresponding to the reflective surface 321 is attached with a structure 342 having a different refractive index to form a light-leaving surface 322 (see FIGS. 8-10).

By means of the guiding apparatus for an imaging light path using the bent light-guiding device 3 to reflect the visible light beam toward a predetermined direction, the installation flexibility of a light source in a space-limited apparatus can be improved.

Figure 11:
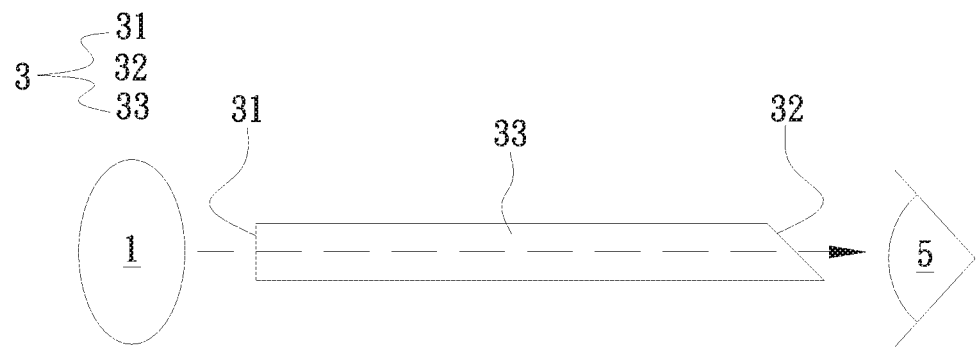
FIG. 11 is a schematic view of the sloped surface structure at the second end of the light-guiding device of the guiding apparatus for an imaging light path according to the first embodiment of the present invention.
Figure 12:
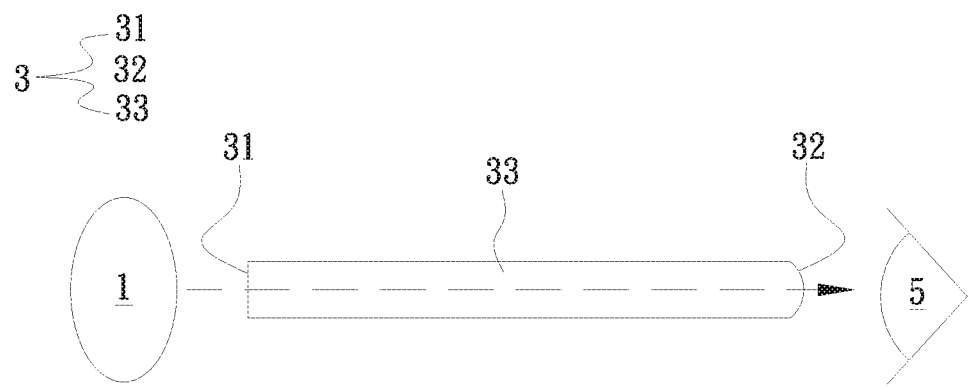
FIG. 12 is a schematic view of the convex surface structure at the second end of the light-guiding device of the guiding apparatus for an imaging light path according to the first embodiment of the present invention.
Figure 13:
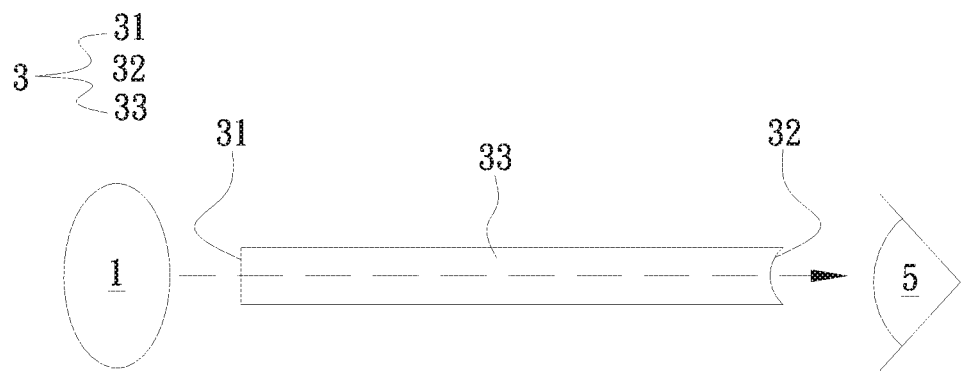
FIG. 13 is a schematic view of the concave surface structure at the second end of the light-guiding device of the guiding apparatus for an imaging light path according to the first embodiment of the present invention.
Figure 14:
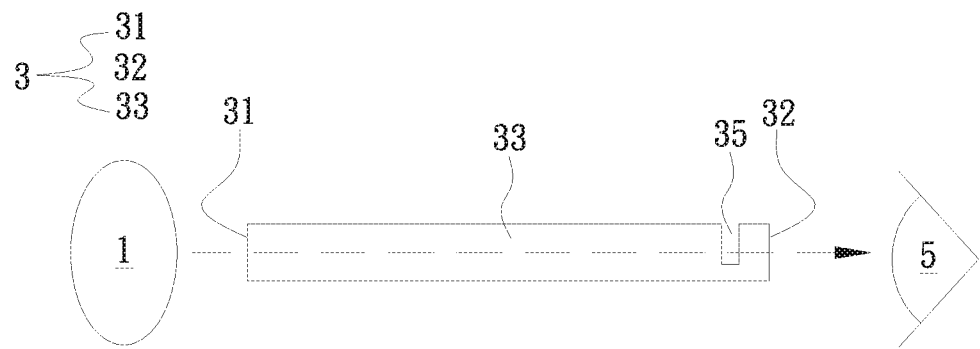
FIG. 14 is a schematic view of the groove of the light-guiding device of the guiding apparatus for an imaging light path according to the first embodiment of the present invention.
Figure 15:
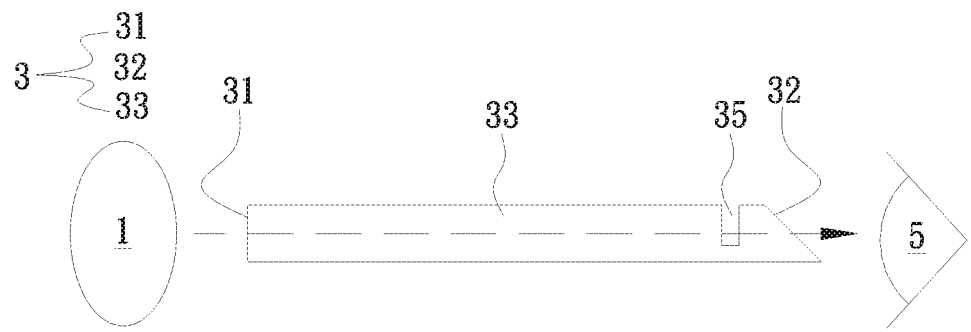
FIG. 15 is a schematic view of the groove on the light path of the guiding apparatus for an imaging light path according to the first embodiment of the present invention.
Figure 16:
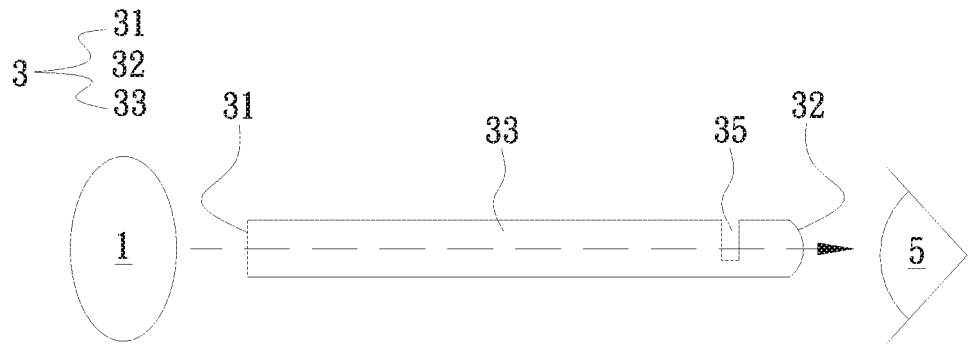
FIG. 16 is a schematic view of the groove of the light-guiding device of the guiding apparatus for an imaging light path according to the second embodiment of the present invention.
Figure 17:
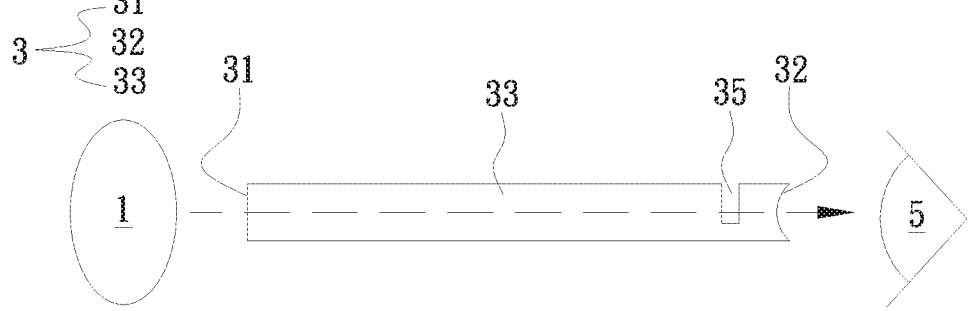
FIG. 17 is another schematic view of the groove of the light-guiding device of the guiding apparatus for an imaging light path according to the second embodiment of the present invention.

The light-guiding device 3 may have a cross section of a circular, a rectangular, or a polygonal shape or any geometric shape. The end surface of at least one of the first end 31 and the second end 32 of the light-guiding device 3 is a flat, sloped, convex, or concave surface. For convenient expression, only the end surface of the second end 32 of the light-guiding device 3 is shown and is represented by a flat surface in the current embodiment, but not limited to this. In other embodiments, the end surface of the second end 32 of the light-guiding device 3 can be a sloped surface (see FIG. 11), a convex surface (see FIG. 12), or a concave surface (see FIG. 13).

In the current embodiment, a groove 35 is formed on the light path 33 of the light-guiding device 3 (see FIGS. 14-17), but not limited to this. In other embodiments, a plurality of grooves (not shown) are formed on the light path 33 of the light-guiding device 3 and are disposed in parallel or in an array form, close to the second end 32. The grooves 35 are disposed close to both or either of the first end 31 and the second end 32. For convenient expression, only the groove 35 close to the second end 32 is shown in the current embodiment. Be means of the visible light beam passing through different optical structures, the shape, size of the image formed by the visible light bema on the image-receiving object can be adjusted and the functions of forming a virtual image or a real image and modifying the imaging can be achieved. The above-mentioned different optical structures include the cross sections of the light-guiding device 3, the end surface structures of the first end 31 and the second end 32, and the grooves 35 on the light path 33.

Figure 18:
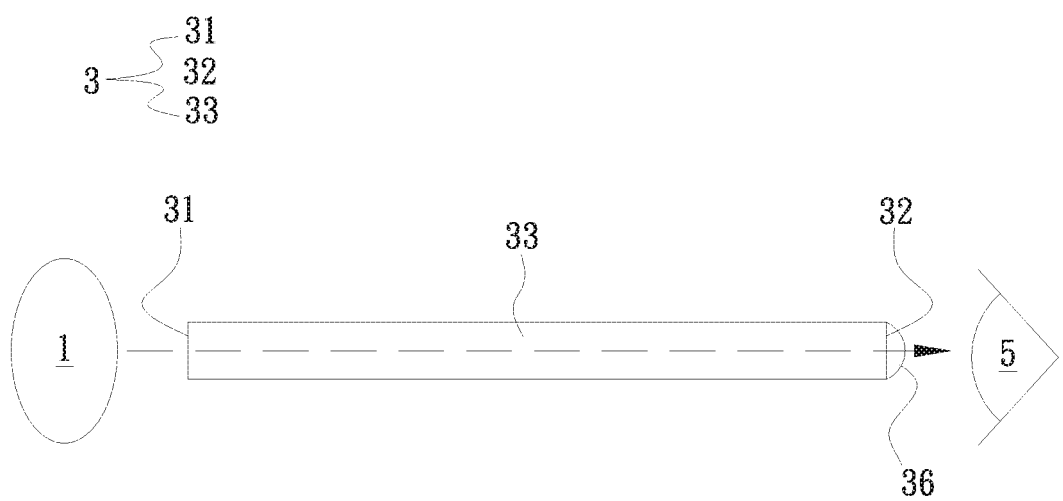
FIG. 18 is a schematic view of the stacked lens of the light-guiding device of the guiding apparatus for an imaging light path according to the second embodiment of the present invention.
Figure 19:
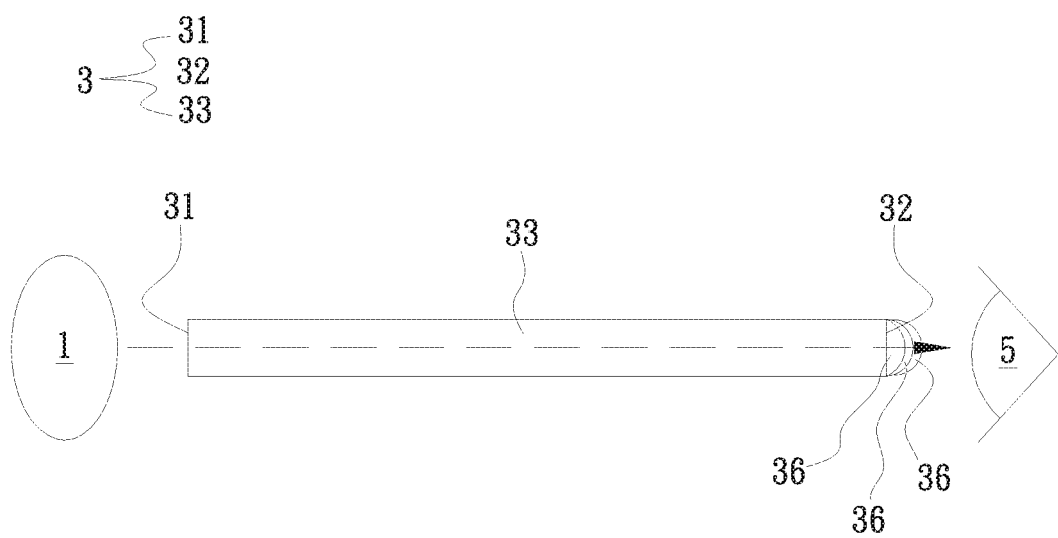
FIG. 19 is a schematic view of the plural stacked lenses of the light-guiding device of the guiding apparatus for an imaging light path according to the second embodiment of the present invention.

At least one lens or equivalent lens (see FIGS. 18 and 19) is stacked coaxially at at least one of the first end 31 and the second end 32 of the light-guiding device 3. For convenient expression, only a lens 36 or plural lenses 36 stacked coaxially on the end surface of the second end 32 are shown in the current embodiment.

The material of the light-guiding device 3 is plastic in the current embodiment, but not limited to this. In other embodiments, the material of the light-guiding device 3 can be glass, quartz, composite material, or any combination of plastic, glass, quartz, and composite material. The light-guiding device 3 is manufactured by a process of etching, deposition, epitaxy, drawing, molding, cutting, or any combination thereof.

In the current embodiment, the image-receiving object 5 is represented by an eye, but not limited to this. In other embodiments, the image-receiving object 5 can be a surface of any physical object (e.g., a lampshade or a protective mirror) or another optical system such as but not limited to a lens or lens set. The surface of the physical object can be transparent, translucent, or opaque. In addition, the surface of the physical object may have a shape with or without a curved surface.

By means of such a design of the present invention, the visible light beam projected by the light-projection system has high brightness and consumes less light energy when arriving at the image-receiving object. Besides, the installation flexibility in a space-limited apparatus can be improved.

Figure 20:
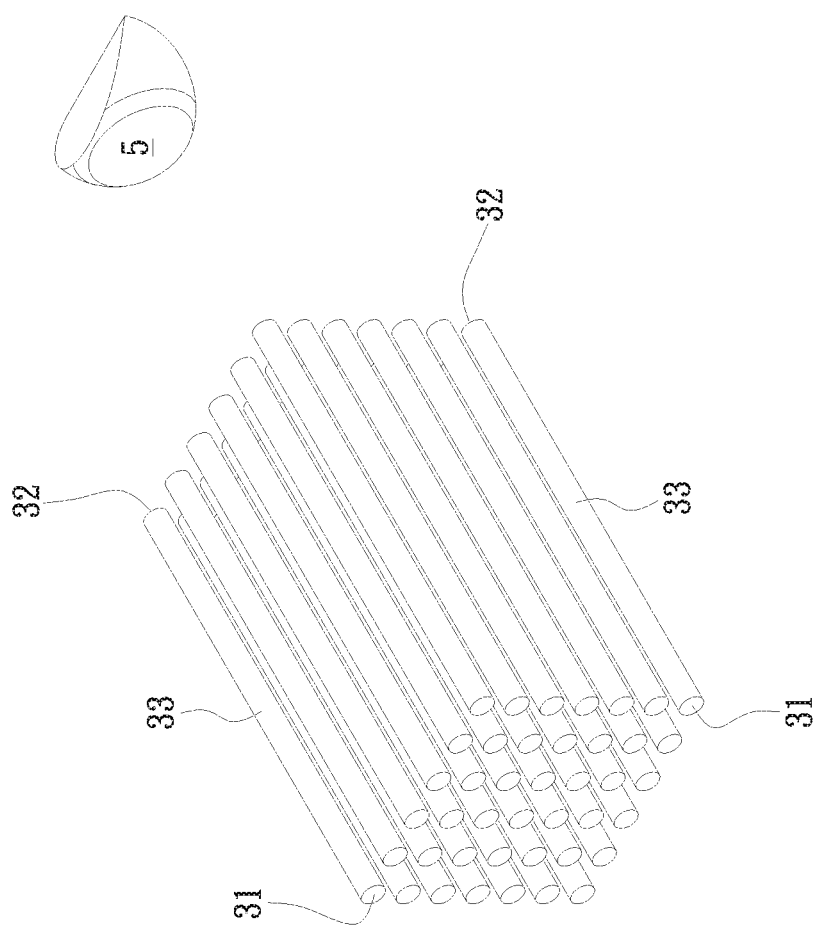
FIG. 20 is a perspective view of the guiding apparatus for an imaging light path according to the second embodiment of the present invention.
Figure 21:
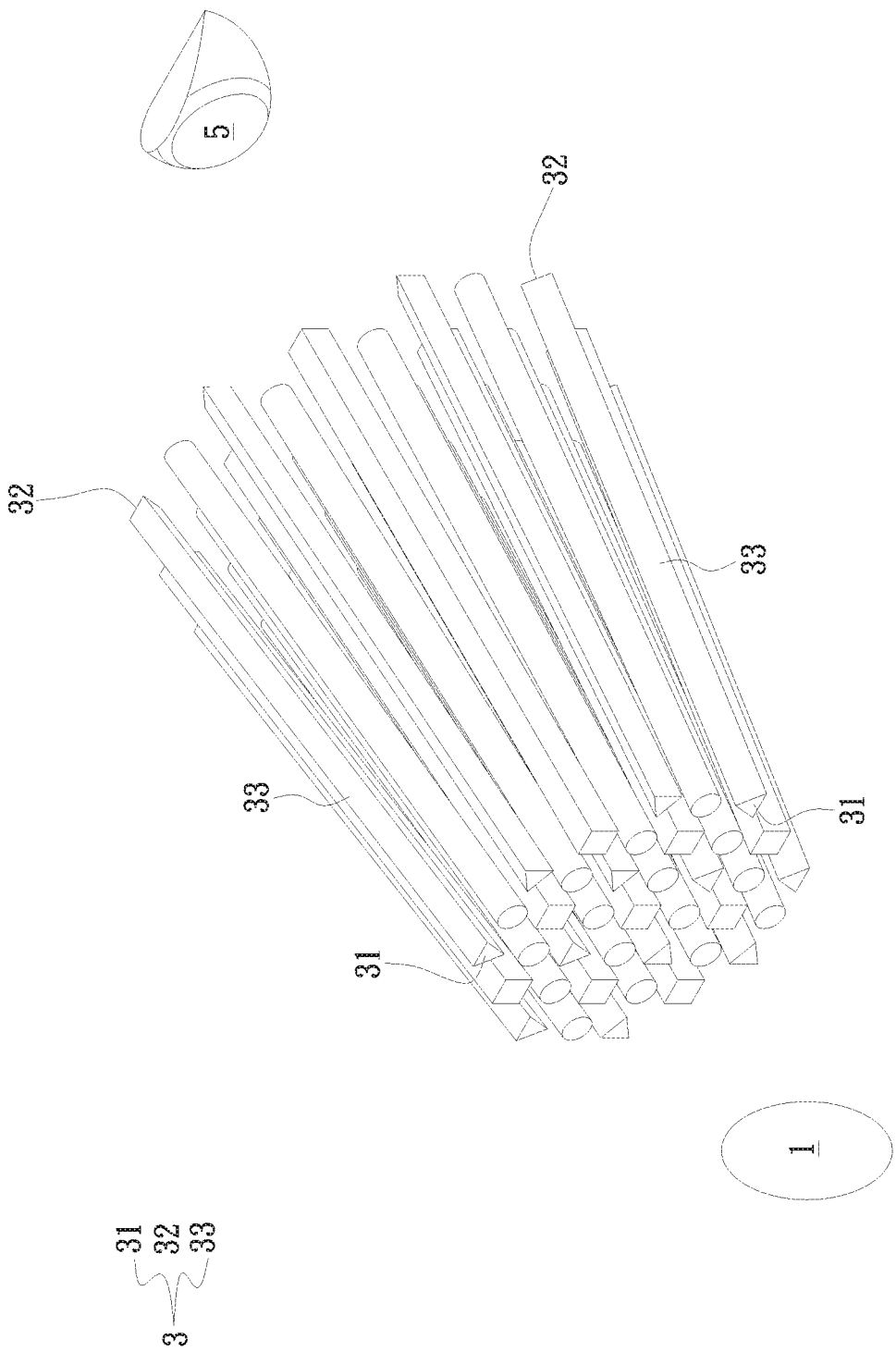
FIG. 21 is a schematic view of the spreading light-guiding devices of the guiding apparatus for an imaging light path according to the second embodiment of the present invention.
Figure 22:
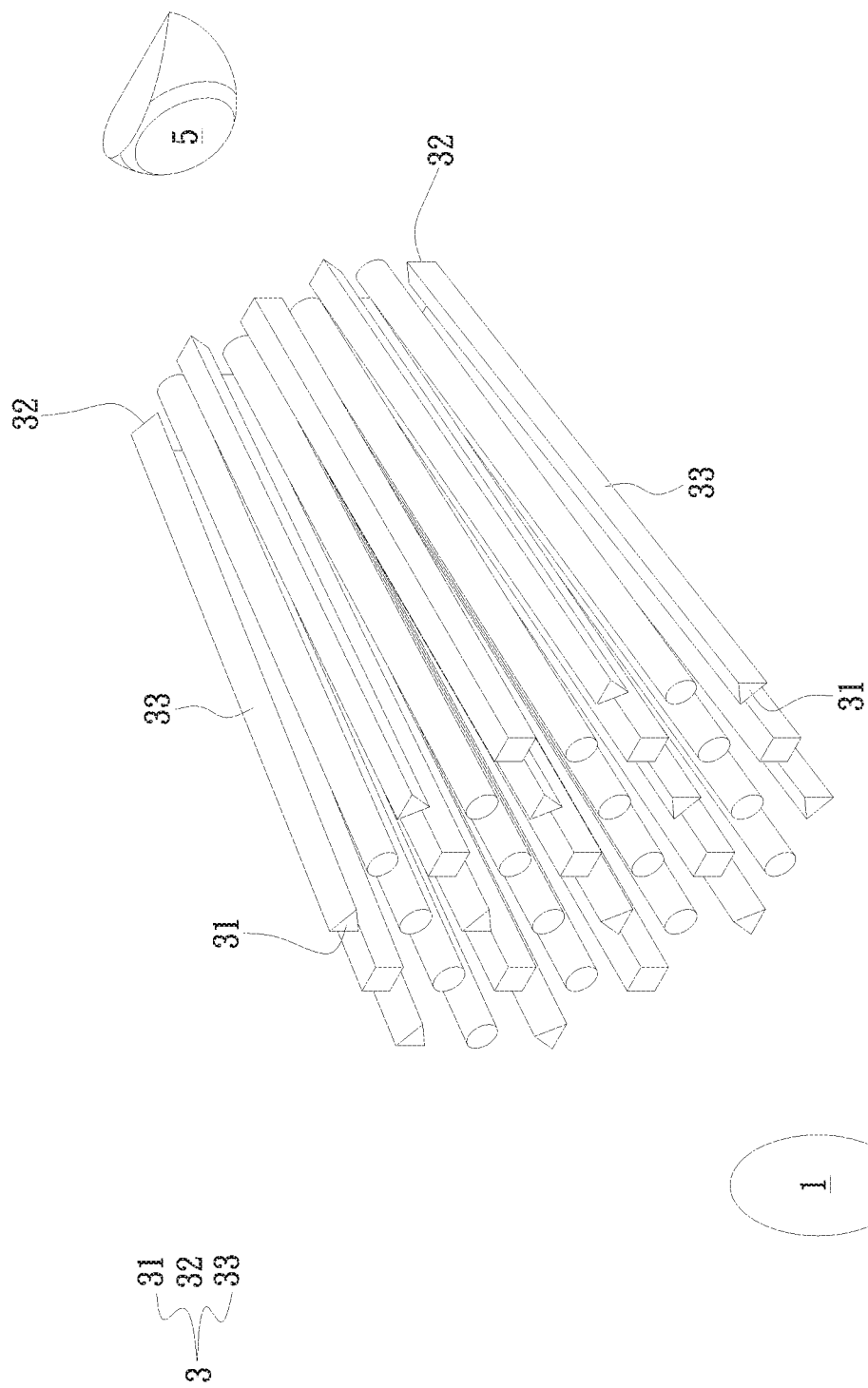
FIG. 22 is a schematic view of the concentrated light-guiding devices of the guiding apparatus for an imaging light path according to the second embodiment of the present invention.
Figure 23:
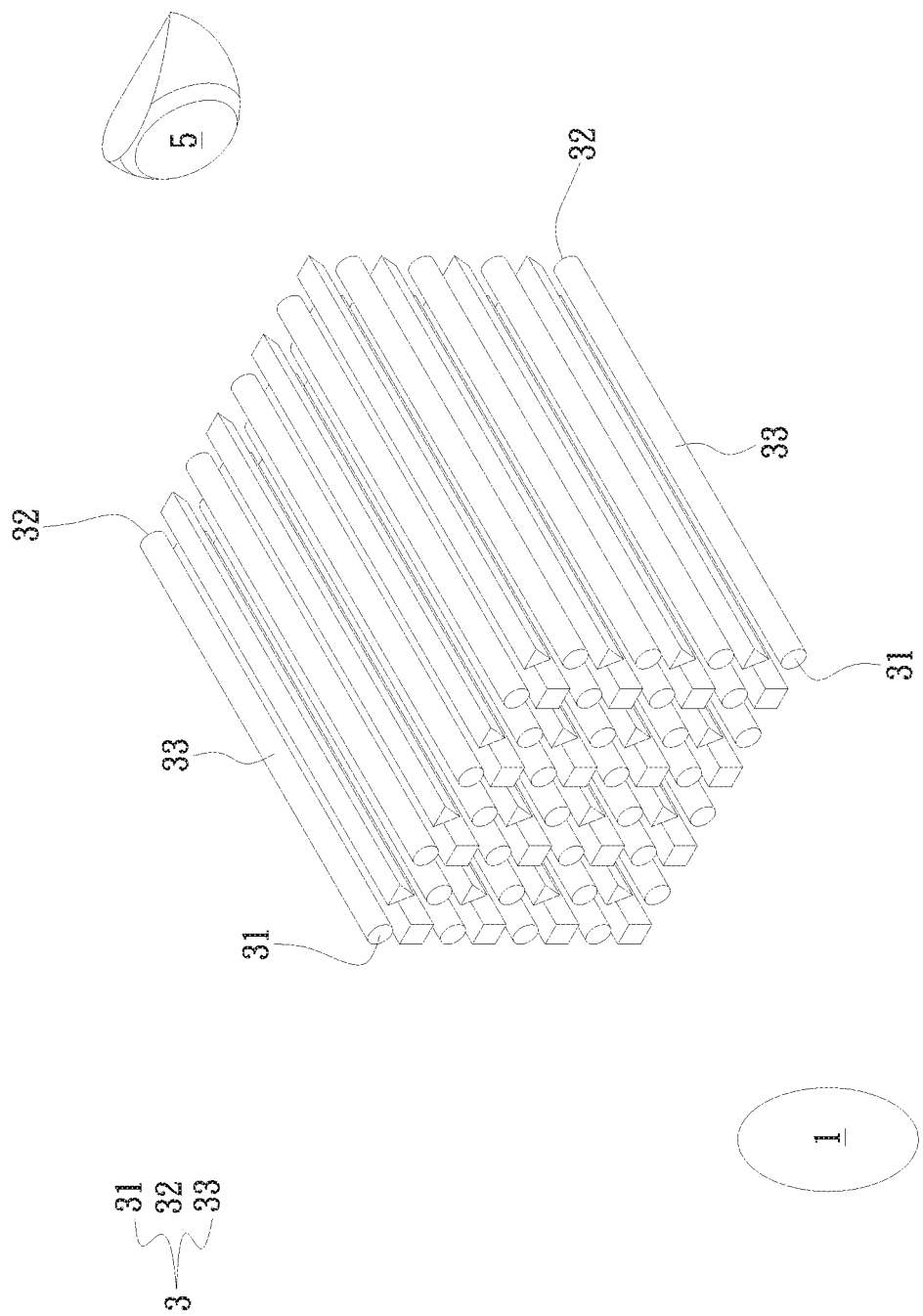
FIG. 23 is a schematic view of a combination of the optical structures, having different cross sections, of the light-guiding devices of the guiding apparatus for an imaging light path according to the second embodiment of the present invention.

Please refer to FIG. 20, which is a perspective view of the stacked guiding apparatuses for an imaging light path according to the second embodiment of the present invention, as well as FIGS. 1-19. As shown in FIG. 20, some structures and functions of the current embodiment are the same as those of the first embodiment and will not be described again. The difference is that the guiding apparatus for an imaging light path of the present invention in the current embodiment has a plurality of light-guiding devices 3 which are stacked and adhered to one another to guide a plurality of visible light beams. In the current embodiment, the light-guiding devices 3 are disposed in parallel, but not limited to this. In other embodiments, the light-guiding devices 3 can be spread from the first end 31 to the second end 32 (see FIG. 21), or are concentrated from the first end 31 to the second end 32 (see FIG. 22).

Moreover, the light-guiding devices 3 individually have the same or different optical structures, each of which has a cross-sectional shape, an end surface, and length. In the current embodiment, the cross-sectional shapes of the light-guiding devices 3 are individually represented by a circle, a triangle, and a rectangle to together form an array (see FIG.

23), but not limited to this. In other embodiments, each of the light-guiding devices 3 can have a cross section of a circular, a rectangular, a polygonal shape, or any combination thereof.

Figure 24:
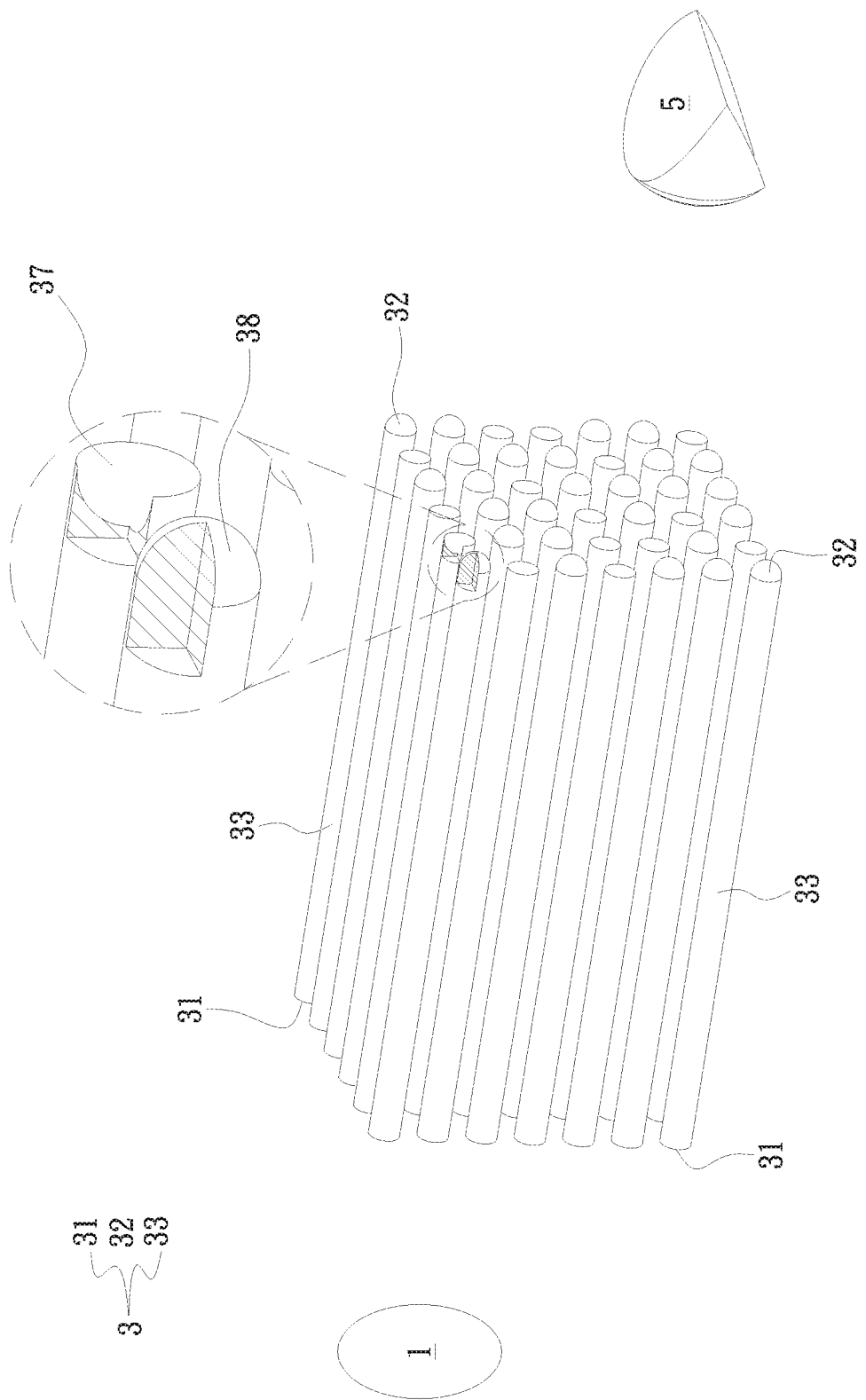
FIG. 24 is a schematic view of a combination of the optical structures, having different end surfaces, of the light-guiding devices of the guiding apparatus for an imaging light path according to the second embodiment of the present invention.

Furthermore, the end surface of at least one of the first end 31 and the second end 32 of each of the light-guiding devices 3 is a flat, sloped, convex, concave surface, or any combination thereof. For convenient expression, only the end surface of the first end 31 of the light-guiding device 3 is shown and is represented by a flat surface in the current embodiment, but not limited to this. In other embodiments, the end surface of the first end 31 of the light-guiding device 3 can be a sloped surface, a convex surface, a concave surface, or any combination thereof (not shown). Alternatively, the end surfaces of the first ends 31 and the second ends 32 can be a combination of different optical structures. For instance, FIG. 24 shows a combination of the different optical structures in which the end surfaces of the second ends 32 are concave surfaces 37 and convex surfaces 38.

Figure 25:
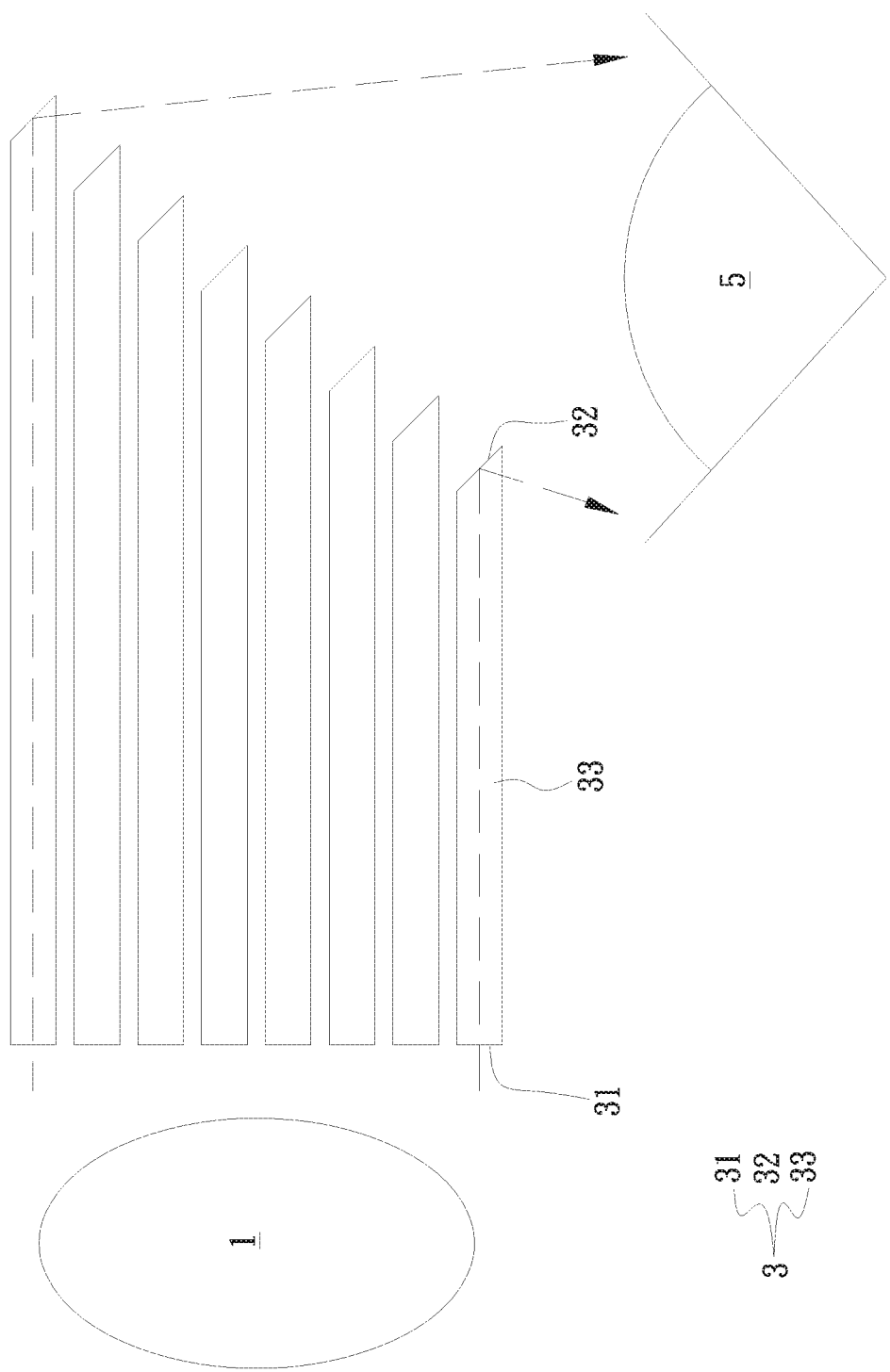
FIG. 25 is a schematic view of the optical structures, gradually decreasing in length, of the light-guiding devices of the guiding apparatus for an imaging light path according to the second embodiment of the present invention.

In the current embodiment, the light-guiding devices 3 are of the same length, but not limited to this. In other embodiments, the light-guiding devices 3 can be of different lengths (not shown). When the light-guiding devices 3 are of different lengths, all the second ends 32 of the light-guiding deices 3 can be designed as reflective surfaces and the lengths of the light-guiding devices 3 are arranged to decrease gradually from the second end 32 to the first end 31 (see FIG. 25. Such that the visible light beams can be reflected to a predetermined direction. In particular, the light guiding devices 3 are arranged such that their lengths decrease gradually towards the image-receiving object 5.

Figure 26:
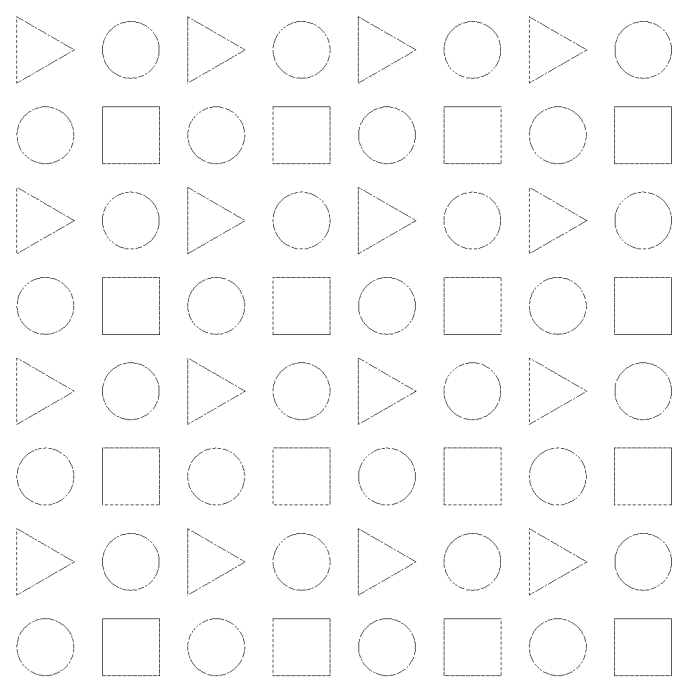
FIG. 26 is a schematic view of the optical structures, disposed as a square array, of the light-guiding devices of the guiding apparatus for an imaging light path according to the second embodiment of the present invention.
Figure 27:
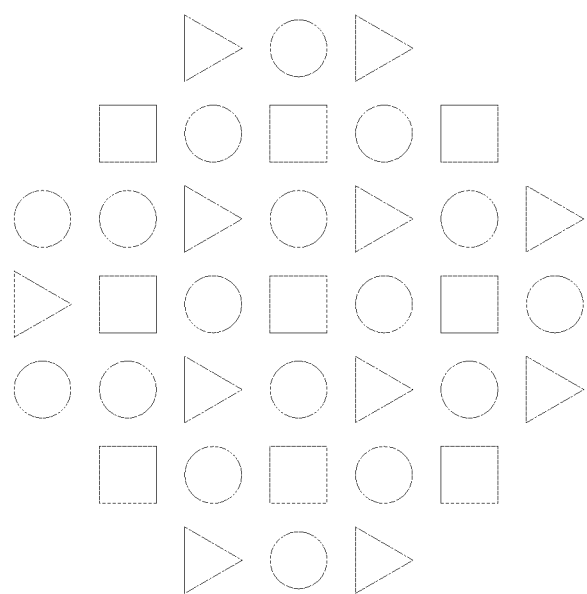
FIG. 27 is a schematic view of the optical structures, disposed as a circular array, of the light-guiding devices of the guiding apparatus for an imaging light path according to the second embodiment of the present invention.
Figure 28:
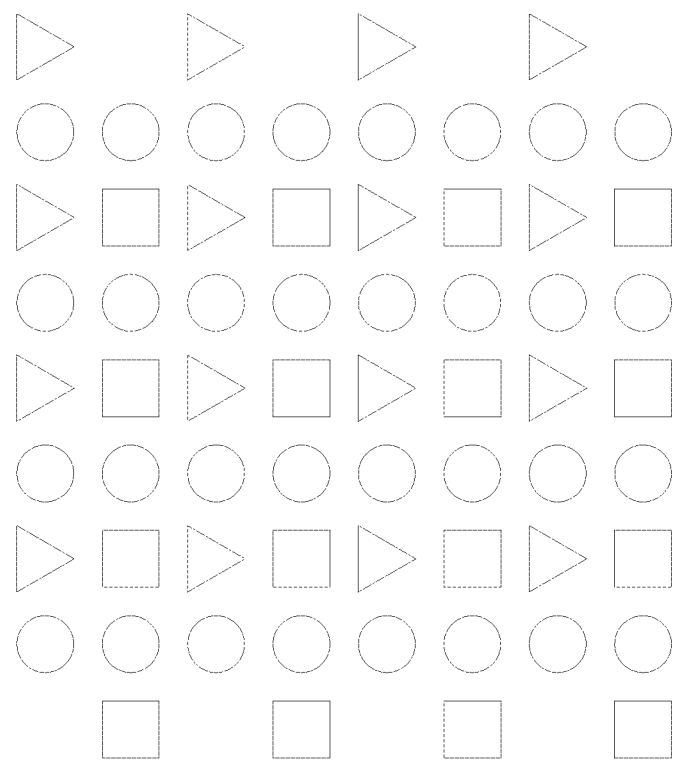
FIG. 28 is a schematic view of the optical structures, disposed as a wavy array, of the light-guiding devices of the guiding apparatus for an imaging light path according to the second embodiment of the present invention.
Figure 29:
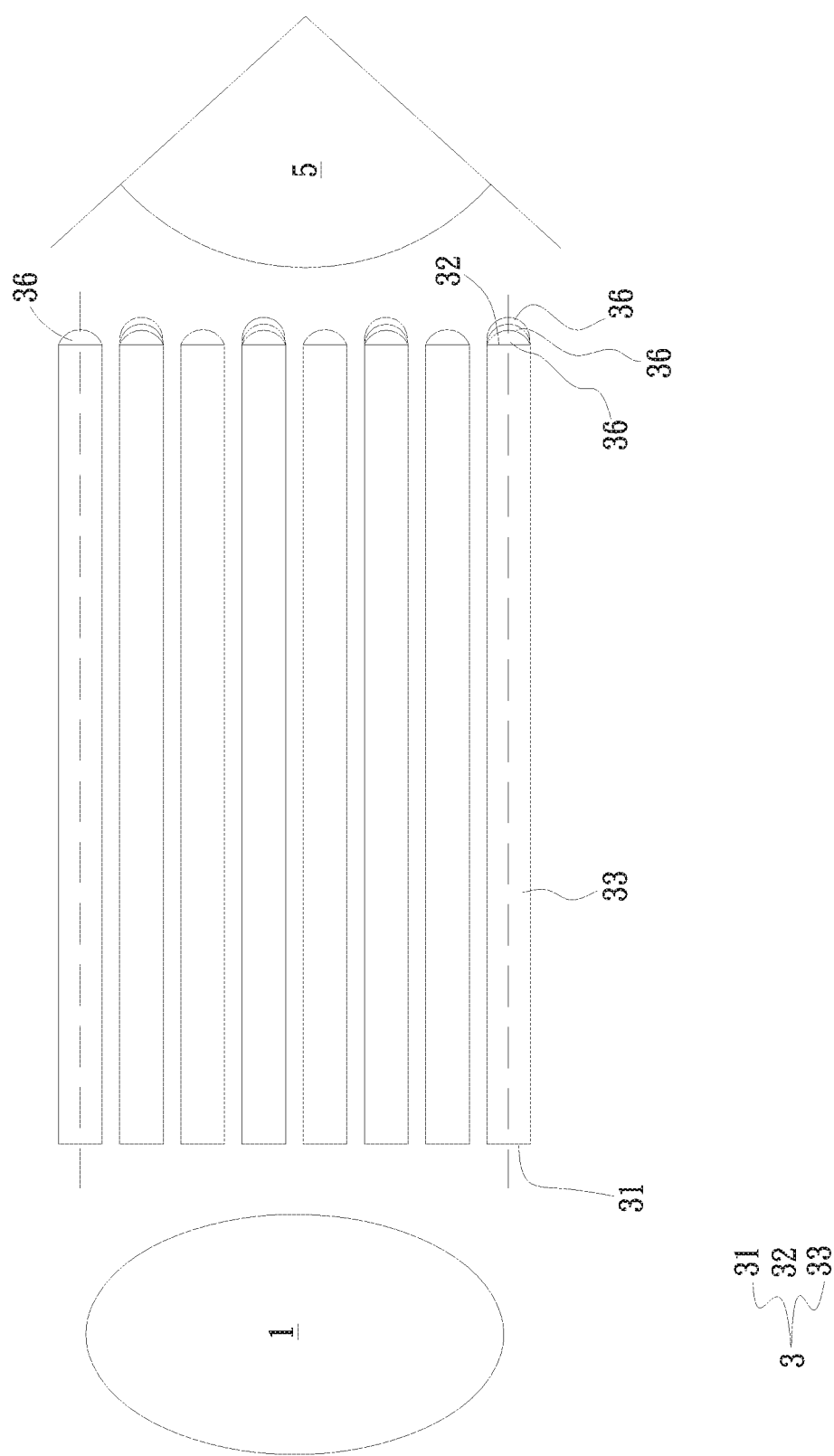
FIG. 29 is a schematic view of a combination of the optical structures, the different stacked lenses, of the light-guiding devices of the guiding apparatus for an imaging light path according to the second embodiment of the present invention.

In the current embodiment, the cross sections of the light-guiding devices 3 form a square array (see FIG. 26) and the visible light beams inputted by the light-guiding devices 3 are corresponding to the square array, but not limited to this. In other embodiments, the cross sections of the light-guiding devices 3 can form a circular array (see FIG. 27), a wavy array (see FIG. 28), any geometric array, or an irregular array (not shown). The visible light beams inputted by the light-guiding devices 3 form the image corresponding to the square array, the circular array, the wavy array, the any geometric array, or the irregular array.

Further, at least one lens 36 or plural lenses are stacked coaxially at at least one of the first ends 31 and the second ends 32 of the light-guiding devices 3. For convenient expression, only the end surfaces of the second ends 32 are shown and are provided with a combination of the lenses 36 with different optical structures in the current embodiment, but not limited to this. In other embodiments, the end surfaces of the first ends 31 of the light-guiding devices 3 can be provided with a combination of the lenses 36 with different optical structures or the end surfaces of the first ends 31 and the second ends 32 can be provided with a combination of the lenses 36 with different optical structures.

Figure 30:
FIG. 30 is a schematic view of the imaging at different distances of the guiding apparatus for an imaging light path according to the second embodiment of the present invention.

In the current embodiment, the light-guiding devices 3 having different cross-sectional shapes mean the light path groups having different optical structures. Also, the number of the light-guiding devices 3 is not limited to those indicated in the accompanying figures in a practical embodiment. Different light path groups individually form corresponding images at different distances out of the second ends 32 (see FIG. 30) in which the visible light beams guided by the light-guiding devices 3 having circular cross sections from the image at a distance of A, guided by the light-guiding devices 3 having square cross sections from the image at a distance of B, and guided by the light-guiding devices 3 having triangular cross sections from the image at a distance of C. In this way, different depths of field can produce different distances of imaging focal plane.

Figure 31:
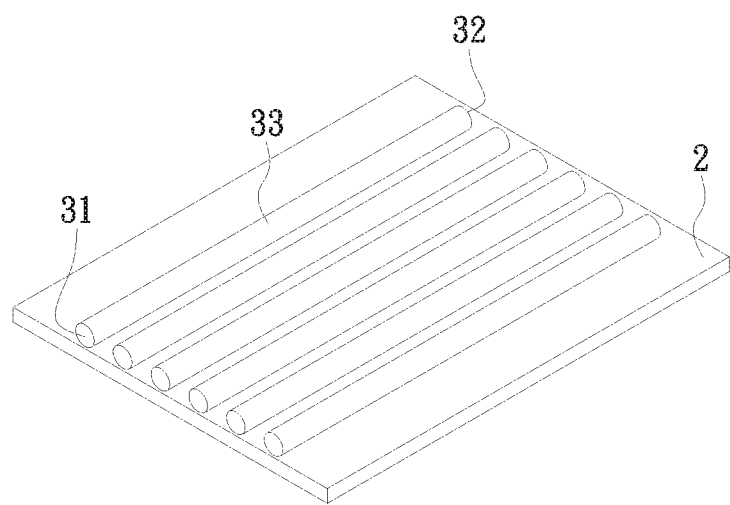
FIG. 31 is a schematic view of the supporting plate carrying plural light-guiding devices of the guiding apparatus for an imaging light path according to the second embodiment of the present invention.
Figure 32:
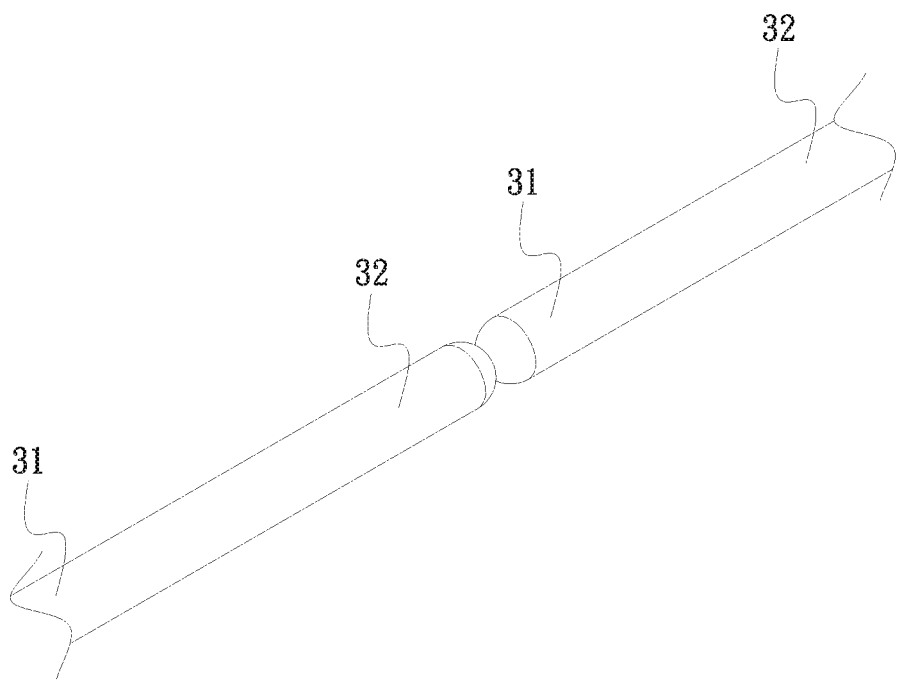
FIG. 32 is a schematic view of the light-guiding devices, disposed coaxially, of the guiding apparatus for an imaging light path according to the second embodiment of the present invention at different distances.

In an alternative embodiment, the light-guiding devices 3 are disposed in parallel on a supporting plate 2 (see FIG. 31). In another alternative embodiment, the light-guiding devices 3 are disposed coaxially in which the first end 31 of one light-guiding device 3 corresponds to the second end 32 of another light-guiding device 3 (see FIG. 32).

Therefore, the visible light beams individually pass through the same or different optical structures of the light-guiding devices 3 to form images at different distances out of the second ends 32.

Figure 33:
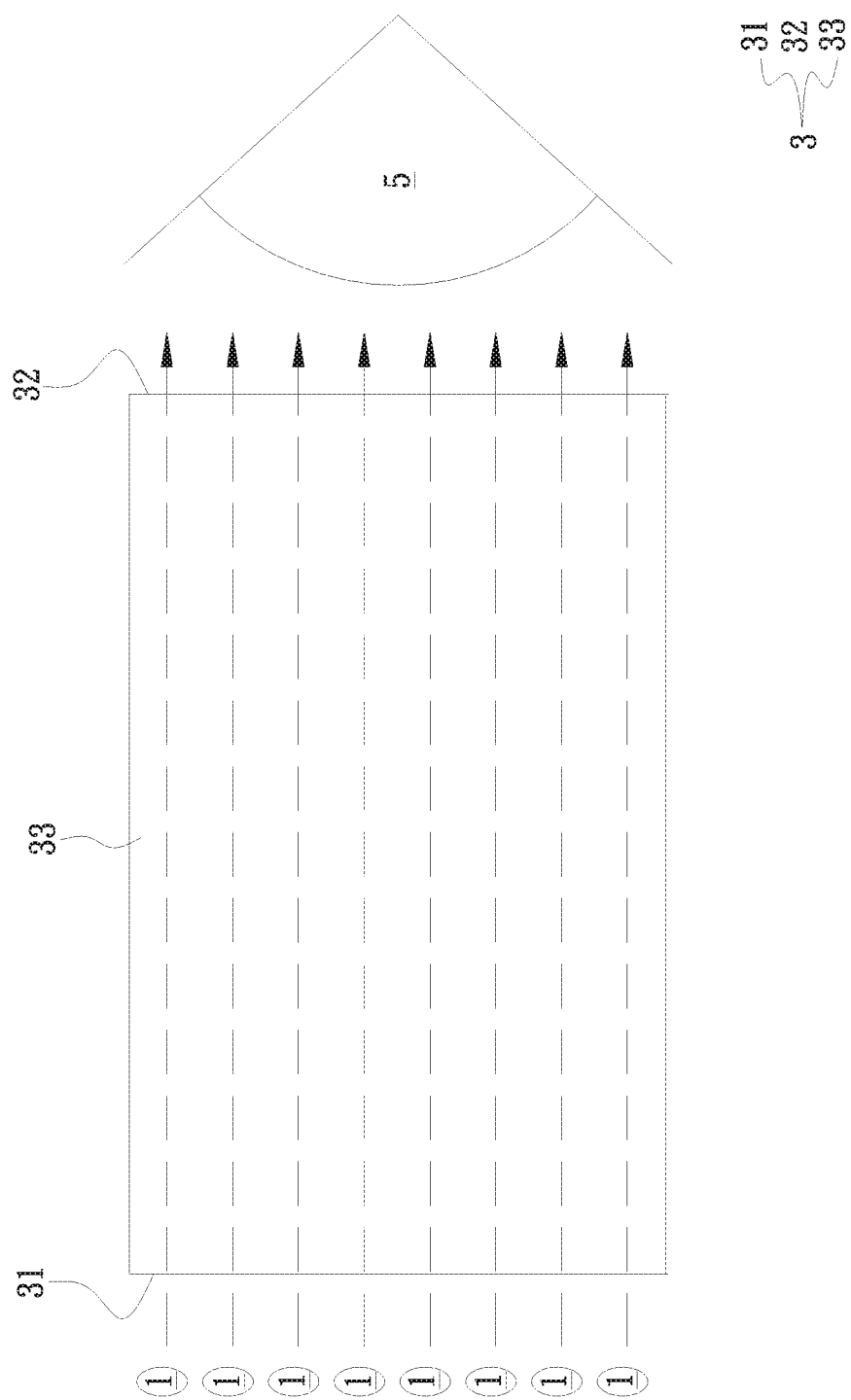
FIG. 33 is a side view of the guiding apparatus for an imaging light path according to the third embodiment of the present invention.
Figure 34:
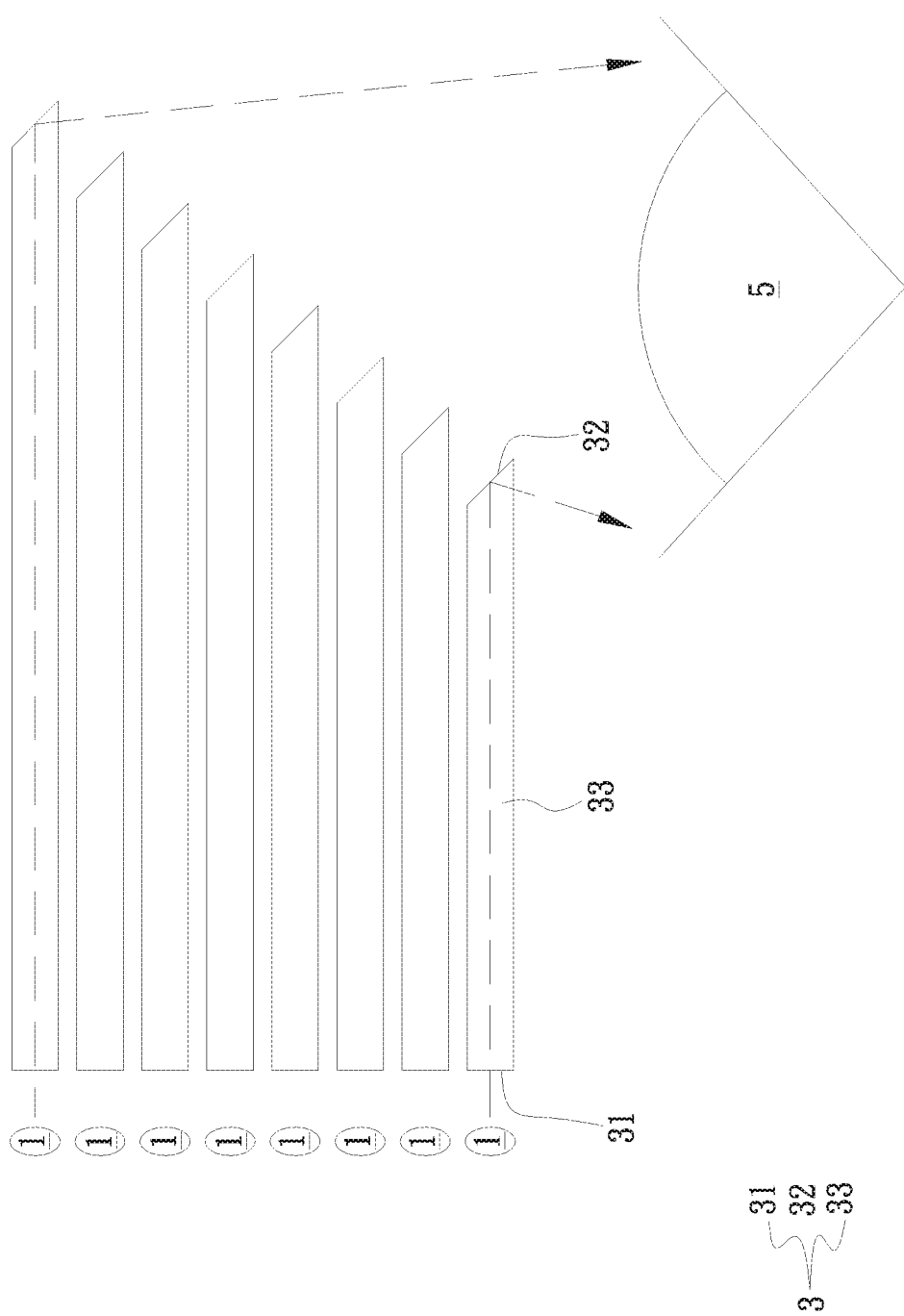
FIG. 34 is a schematic view of the optical structures, gradually decreasing in length, of the light-guiding devices of the guiding apparatus for an imaging light path according to the third embodiment of the present invention.
Figure 35:
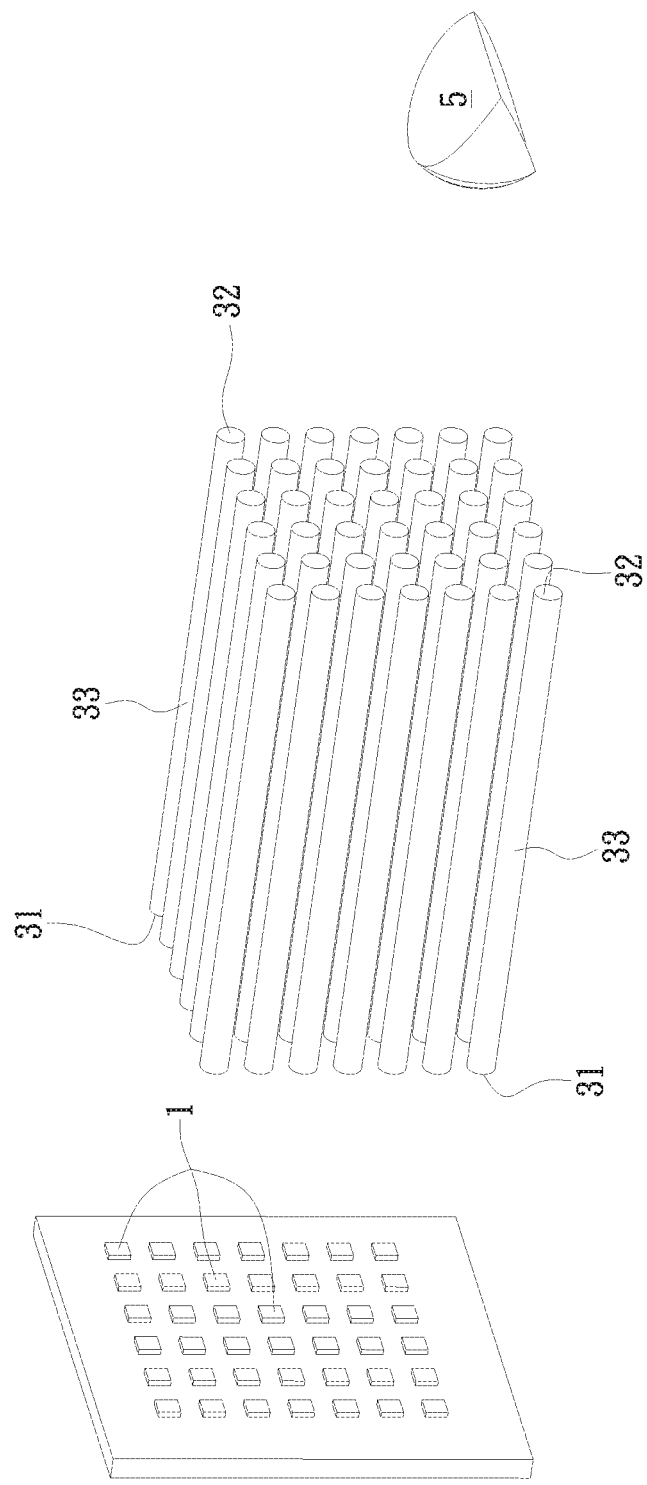
FIG. 35 is a perspective view of the light-projection structure of the guiding apparatus for an imaging light path according to the third embodiment of the present invention.

Please refer to FIGS. 33 and 34, which are the side views of the guiding apparatus for an imaging light path according to the third embodiment of the present invention, as well as FIGS. 1-32. As shown in FI S. 33 and 34, some structures and functions of the current embodiment are the same as those of the first and the second embodiments and will not be described again. The difference is that the guiding apparatus for an imaging light path of the present invention in the current embodiment has a plurality of light-projection systems 1 used to project plural visible light beams. In the current embodiment, the light-projection systems 1 are disposed as a square array, but not limited to this. In other embodiment, the light-projection systems 1 can be disposed as a circular array, a wavy array, or an irregular array.

Moreover, in the current embodiment, the light-projection systems 1 are organic light-emitting diode displays, but not limited to this. In other embodiments, the light-projection systems 1 can be light-emitting diode displays, micro light-emitting diode displays, MEMS controlled laser projectors, liquid crystal on silicon projectors, thin film transistor liquid crystal displays, digital light processing projector, or any combination thereof.

In addition, the visible light beams projected by the light-projection systems 1 can have the same or different wavelengths, which range from 380 nm to 750 nm.

Figure 36:
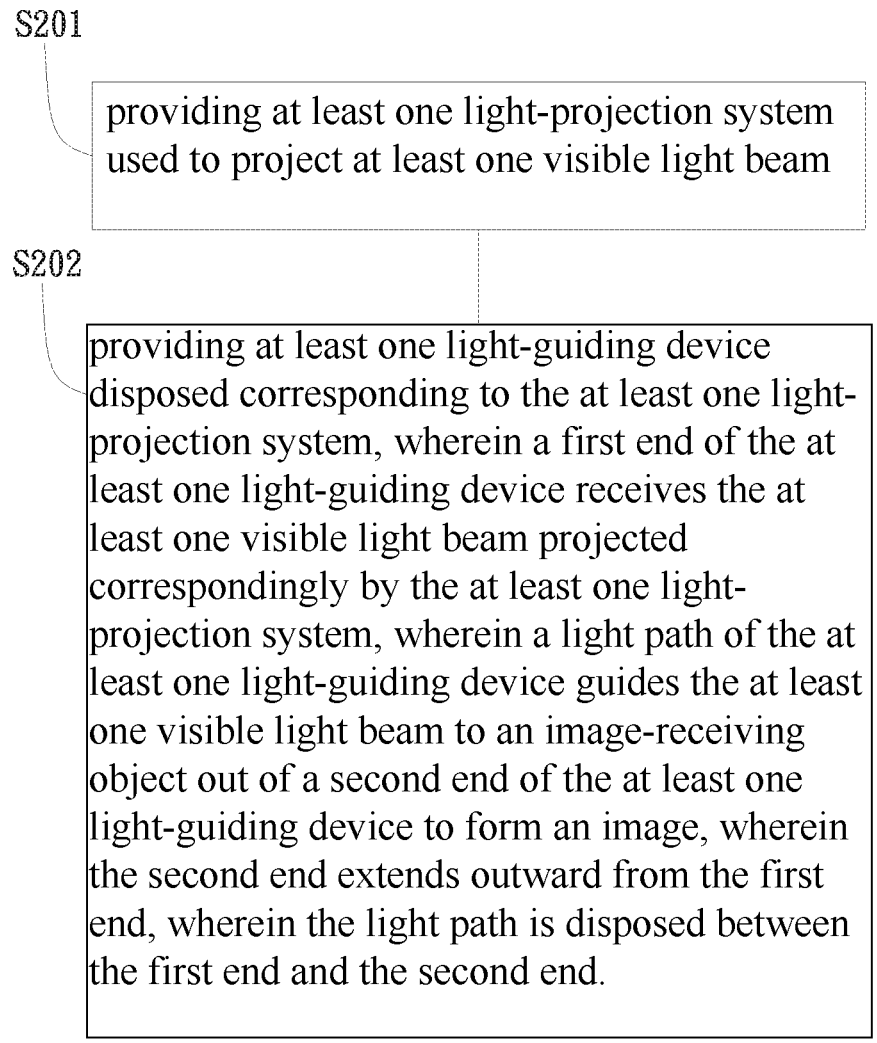
FIG. 36 is the flow chart of the guiding method of an imaging light path of the present invention.

Please refer to FIG. 36, which is the flow chart of the guiding method associated with the guiding apparatus for an imaging light path according to the first, second, and third embodiments of the present invention. As shown in FIG. 36, the guiding method of an imaging light path comprises the steps of Step S201 and Step S202.

In Step S201, at least one light-projection system is provided and used to project at least one visible light beam. The at least one light-projection system 1 is used to project at least one visible light beam which is indicated by a dashed arrow in accompanying figures.

In Step S202, at least one light-guiding device is provided and disposed corresponding to the at least one light-projection system. A first end of the at least one light-guiding device receives the at least one visible light beam projected correspondingly by the at least one light-projection system. A light path of the at least one light-guiding device guides the at least one visible light beam to an image-receiving object out of a second end of the at least one light-guiding device to form an image. The second end extends outward from the first end; the light path is disposed between the first end and the second end. The light-guiding device 3 is disposed corresponding to the light-projection system 1 and has a first end 31, a second end 32, and a light path 33. The second end 32 extends outward from the first end 31; that is, the second end 32 extends outward from the first end 31, away from the light-projection system 1. The light path 33 is disposed between the first end 31 and the second end 32. The visible light beam projected correspondingly by the light-projection system 1 is received at the first end 31 and guided to an image-receiving object 5 out of the second end 32 through the light path 33 to form an image.

The embodiments of the present invention are detailed above. The embodiments described above are only preferred ones of the present invention and are not to limit the scope of the present invention. All the equivalent modifications and variations applying the specification and figures of the present invention should be embraced by the claimed scope of the present invention.

What is claimed is:

1. A guiding apparatus for an imaging light path, comprising:
    at least one light-projection system used to project a plurality of visible light beams; and
    a plurality of light-guiding devices disposed corresponding to the at least one light-projection system and each having a first end, a second end extending outward from the first end, and a light path disposed between the first end and the second end, wherein the visible light beams are received at the first ends and guided to an image-receiving object out of the second ends through the light paths;
    wherein the plurality of light-guiding devices each have different lengths from the second ends to the first ends, the light-guiding devices arranged such that their lengths decrease gradually towards the image-receiving object; and
    wherein all the second ends are reflective surfaces to direct the visible light beams towards the image-receiving object.

2. The guiding apparatus for an imaging light path according to claim 1, wherein the at least one light-projection system is one of a light-emitting diode display, an organic light-emitting diode display, a micro light-emitting diode display, a MEMS controlled laser projector, a liquid crystal on silicon projector, a thin film transistor liquid crystal display, and a digital light processing projector or is any combination thereof, wherein each of the plurality of visible light beams independently has a wavelength ranging from 380 nm to 750 nm.

3. The guiding apparatus for an imaging light path according to claim 1, wherein the at least one light-projection system is plural in number and is disposed as a square array, a circular array, a wavy array, or an irregular array, wherein each of the plurality of visible light beams independently has the same or different wavelengths.

4. The guiding apparatus for an imaging light path according to claim 1, wherein each of the light-guiding devices is a structure of a solid transparent bar.

5. The guiding apparatus for an imaging light path according to claim 1, wherein the plurality of light-guiding devices are straight bar structures.

6. The guiding apparatus for an imaging light path according to claim 1, wherein an end surface of the second end of each of the light-guiding devices is surface-treated or is attached with a structure having a different refractive index to form a reflective surface, wherein the second end corresponding to the reflective surface is surface-treated or is attached with a structure having a different refractive index to form a light-leaving surface.

7. The guiding apparatus for an imaging light path according to claim 1, wherein the material of each of the light-guiding devices is plastic, glass, quartz, composite material, or any combination thereof, and each of the light-guiding devices is manufactured by a process of etching, deposition, epitaxy, drawing, molding, cutting, or any combination thereof.

8. The guiding apparatus for an imaging light path according to claim 1, wherein the plurality of light-guiding devices are stacked and adhered to one another such that, the plurality of light-guiding devices are disposed in parallel, are spread from the first ends to the second ends, or are concentrated from the first ends to the second ends.

9. The guiding apparatus for an imaging light path according to claim 8, wherein the cross sections of the light-guiding devices form a square array, a circular array, a wavy array, any geometric array, or an irregular array, wherein the visible light beams inputted by the light-guiding devices form the image corresponding to the square array, the circular array, the wavy array, the any geometric array, or the irregular array.

10. The guiding apparatus for an imaging light path according to claim 1, wherein the image-receiving object is an eye or a surface of any physical object.

11. A guiding method of an imaging light path, comprising the steps of:
    providing at least one light-projection system used to project a plurality of visible light beams; and
    providing a plurality of light-guiding devices disposed corresponding to the at least one light-projection system, wherein each first end of the light-guiding devices receives a visible light beam, wherein each light path of the light-guiding devices guides the visible light beam to an image-receiving object out of each second end of the light-guiding devices, wherein the second end extends outward from the first end, wherein the light path is disposed between the first end and the second end;
    wherein the plurality of light-guiding devices each have different lengths from the second ends to the first ends, the light-guiding devices arranged such that their lengths decrease gradually towards the image-receiving object; and
    wherein all the second ends are reflective surfaces to direct the visible light beams towards the image-receiving object.

* * * * *